(12) United States Patent
Corl, Jr. et al.

(10) Patent No.: US 7,478,426 B2
(45) Date of Patent: Jan. 13, 2009

(54) MULTI-FIELD CLASSIFICATION DYNAMIC RULE UPDATES

(75) Inventors: Everett A. Corl, Jr., Raleigh, NC (US);
Gordon T. Davis, Chapel Hill, NC (US);
Clark D. Jeffries, Durham, NC (US)

(73) Assignee: International Busines Machines Corporation, Armonk, NY (US)

( * ) Notice: Subject to any disclaimer, the term of this patent is extended or adjusted under 35 U.S.C. 154(b) by 882 days.

(21) Appl. No.: 10/894,628

(22) Filed: Jul. 20, 2004

(65) Prior Publication Data

US 2006/0020600 A1 Jan. 26, 2006

(51) Int. Cl.
*G06F 15/16* (2006.01)
*G06F 9/00* (2006.01)

(52) U.S. Cl. .................. 726/13; 726/11; 709/223; 709/224; 709/238; 706/47

(58) Field of Classification Search ............. 726/13, 726/11; 709/224, 223, 238; 706/47
See application file for complete search history.

(56) References Cited

U.S. PATENT DOCUMENTS

| | | | |
|---|---|---|---|
| 6,404,752 B1 * | 6/2002 | Allen et al. | 370/335 |
| 6,460,120 B1 * | 10/2002 | Bass et al. | 711/148 |
| 6,473,763 B1 | 10/2002 | Corl, Jr. et al. | |
| 6,484,171 B1 | 11/2002 | Corl, Jr. et al. | |
| 6,484,261 B1 | 11/2002 | Wiegel | |
| 6,715,081 B1 | 3/2004 | Attwood et al. | |
| 2002/0009076 A1 * | 1/2002 | Engbersen et al. | 370/389 |
| 2002/0023089 A1 * | 2/2002 | Woo | 707/101 |
| 2002/0198981 A1 * | 12/2002 | Corl et al. | 709/224 |
| 2003/0074580 A1 * | 4/2003 | Knouse et al. | 713/201 |

OTHER PUBLICATIONS

D.R. Morrison, "PATRICIA-Practical Algorithm to Retrieve Information Coded in Alphanumeric", Jrnl. of hte ACM, 15(4) pp. 514-534, Oct. 1968.*

* cited by examiner

*Primary Examiner*—Nasser Moazzami
*Assistant Examiner*—Eleni A Shiferaw
(74) *Attorney, Agent, or Firm*—Joscelyn G. Cockburn; Patrick J. Daugherty; Driggs, Hogg, Daugherty & Del Zoppo Co., LPA

(57) ABSTRACT

The present invention relates to a method and computer system device for applying a plurality of rules to data packets within a network computer system. A filter rule decision tree is updated by adding or deleting a rule. If deleting a filter rule then the decision tree is provided to a network data plane processor with an incremental delete of the filter rule. If adding a filter rule then either providing an incremental insertion of the filter rule to the decision tree or rebuilding the first decision tree into a second decision tree responsive to comparing a parameter to a threshold. In one embodiment the parameter and thresholds relate to depth values of the tree filter rule chained branches. In another the parameter and thresholds relate to a total count of rule additions since a building of the relevant tree.

14 Claims, 6 Drawing Sheets

MULTI-FIELD CLASSIFICATION DYNAMIC RULE UPDATES

BACKROUND OF THE INVENTION

FIG. 1 depicts conventional networks 10 and 20 which may be connected to the Internet 30. Each network 10 and 20 includes host 12, 14 and 16 and 22 and 24, respectively. Each network 10 and 20 also includes a switch 18 and 26, respectively, and may include one or more servers such as the servers 17, 19 and 28, respectively. In addition, each network 10 and 20 may include one or more gateways 13 and 25, respectively, to the Internet 30. Not explicitly shown are routers and other portions of the networks 10 and 20 which may also control traffic through the networks 10 and 20 and which will be considered to be inherently depicted by the switches 18 and 26, respectively, and the networks 10 and 20 in general.

In order to manage communications in a network, such as the network 10 or 20, filter rules are used to enforce a plurality of networking rules for multi-field classification searches of the network. Filter rules are typically employed by switches of the network. Exemplary rules include filtering, quality of service, traffic engineering and traffic redirection rules. A filter rule may test packets entering the network from an outside source to ensure that attempts to break into the network can be thwarted. For example, traffic from the Internet 30 entering the network 10 may be tested in order to ensure that packets from unauthorized sources are denied entrance. Similarly, packets from one portion of a network may be prevented from accessing another portion of the network. For example, a packet from some of the hosts 12, 14 or 16 may be prevented access to either the server 17 or the server 19. The fact that the host attempted to contact the server may also be recorded so that appropriate action can be taken by the owner of the network. Filter rules may also be used to transmit traffic based on the priorities of packets. For example, packets from a particular host, such as the host 12, may be transmitted because the packets have higher priority even when packets from the hosts 14 or 16 may be dropped. Filter rules may also be used to ensure that new sessions are not permitted to be started when congestion is high even though traffic from established sessions is transmitted.

Filter rules generally test a packet "key" in order to determine whether the filter rule will operate on a particular packet. The key that is typically used is the Internet Protocol (IP) "five-tuple" of the packet. The IP five-tuple typically contains five fields of interest: the source address, the destination address, the source port, the destination port and the protocol. These fields are typically thirty-two bits, thirty-two bits, sixteen bits, sixteen bits and eight bits, respectively. Thus, the part of IP five-tuple of interest is typically one hundred and four bits in length. Filter rules typically utilize these one hundred and four bits, and possible more bits, in order to perform their functions. For example, based on the source and destination addresses, the filter rule may determine whether a packet from a particular host is allowed to reach a particular destination address.

Filter rules can also interact, based on the priority for the filter rule. For example, a first filter rule may be a default filter rule, which treats most cases. A second filter rule can be an exception the first filter rule. The second filter rule would typically have a higher priority than the first filter rule to ensure that where a packet matches both the first and the second filter rule, the second filter rule will control.

One well known structure for organizing and applying a plurality of filter rules is a "Patricia tree", wherein Patricia refers to the acronym PATRICIA: Practical Algorithm to Retrieve Information Coded in Alphanumeric. A Patricia tree is a decision tree structure, wherein a "yes" or "no" decision from the application of a first "node" filter rule leads to the responsive selection of one of two sub-tree "branch" filter rules, each of which may serve as a node of two more sub-tree branch filter rule applications, each of which may also serve as another sub-node. One reference for Patricia trees is D. R. Morrison, "PATRICIA—Practical Algorithm to Retrieve Information Coded in Alphanumeric", Jrnl. of the ACM, 15(4) pp 514-534, October 1968.

With respect to Patricia tree applications in network filter rule management it is known that a balanced tree structure is desired in order to minimize the depth of the tree, and thus minimize search times. U.S. Pat. No. 6,473,763 to Corl, Jr. et al for "System, Method and Computer Program for Filtering Multi-Action Rule Set" issued Oct. 29, 2002 (the "'763 patent") describes a method of resolving a Multi-field search key to an associated network management rule (such as, for example filtering, QOS, and redirection rules). The '763 patent teaches a "choice bit" algorithm for optimally select distinguishing bits while building a tree structure with an optimum balance, thus minimizing the number of chained pointers (i.e. "depth" of the tree) that must be traversed to resolve a search. The entire tree is rebuilt in a network control plane each time an update is required, the new tree is downloaded to a network data plane, and the data plane is then switched to the new tree while obsolescing the old tree.

This approach works reasonably well for applications requiring infrequent rule changes, for example where a network administrator specifically alters rules to account for an office move. However, processor cycle and bandwidth limits between the control plane and the data plane limit the usefulness of this method when rule changes are more frequent.

What is needed is an improved method and system for handling network filter rule changes that efficiently supports frequent incremental updates to the network filter rules without requiring responsively large network resource commitments, processor cycles and bandwidth.

SUMMARY OF THE INVENTION

The present invention relates to a method and computer system device for applying a plurality of rules to data packets within a network computer system. A filter rule decision tree is updated by adding or deleting a rule. If deleting a filter rule then the decision tree is provided to a network data plane processor with an incremental delete of the filter rule. If adding a filter rule then either providing an incremental insertion of the filter rule to the decision tree or rebuilding the first decision tree into a second decision tree responsive to comparing a parameter to a threshold. In one embodiment the parameter and thresholds relate to depth values of the tree filter rule chained branches. In another the parameter and thresholds relate to a total count of rule additions since a building of the relevant tree.

Figure 1:
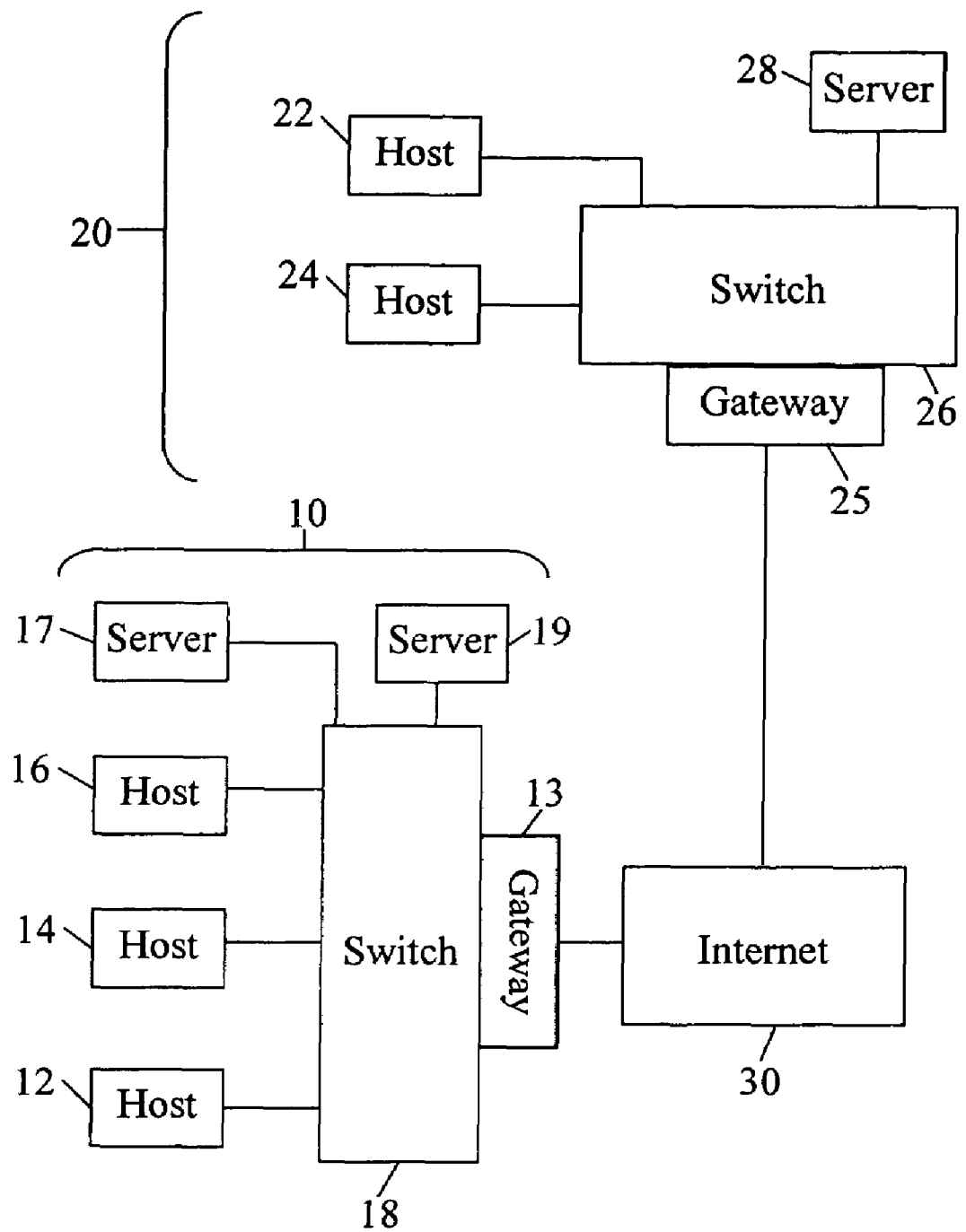
FIG. 1 is a block diagram of a conventional computer network system.

DESCRIPTION OF THE PREFERRED
EMBODIMENTS

The present invention provides an improved method and system for handling rule changes that efficiently supports frequent incremental updates. The method and system are based on the fact that a slightly sub-optimal tree structure can be tolerated with very little impact to search latency. The present invention thus responds to each individual rule insertion or deletion according to the same procedures used in a Fixed Match (FM) Tree. FM trees are more fully described in commonly-assigned U.S. Pat. No. 6,675,163, issued Jan. 6, 2004 to Bass et al. for "Full match (FM) search algorithm implementation for a network processor", which is hereby incorporated by reference into this description as fully as if here represented in full. What is new in the present invention is a system and method for supplementing prior art procedures to determine whether or not the insertion of a new rule can be made without rebuilding the table.

In a preferred implementation, the deletion of a rule will never require rebuilding the table, since it can only make a tree branch shorter. Alternatively, the insertion of a new rule will make a tree branch longer by adding one new node at the end of the closest matching branch. This insertion point is determined by identifying the last node visited while doing a search for the entry. Note that the search will be unsuccessful, since the entry hasn't been added yet. It will follow a linked list of pointers in the Patricia tree structure ending at a table entry that causes a "miscompare." It is conventional for network hardware to remember the last node in the Patricia tree (the one pointing to the table entry that caused miscompare). However, if the insertion doesn't impact the previously longest branch of the tree, it will not increase the worst-case latency. Accordingly, in one embodiment of the present invention a test is applied whenever a rule is inserted to determine the number of chained pointers required to solve a search to the new rule. If the resulting tree depth is greater than the tolerable worst-case tree depth, the tree is rebuilt by the control point. An important advantage of the present invention is that the test insertion and rule check may be done in the control point, and the decision made about rebuilding the table can be made without disrupting the data plane.

According to the present invention a "tolerable worst case" tree depth is determined each time the tree is rebuilt, and is preferably set responsive to the longest chain of pointers in the current tree. In some embodiments the worst case tree depth is set equivalent to the length of the current longest chain of pointers: thus if the new rule is added to a smaller chain in the current chain no rebuild is indicated. Alternatively, worst case tree depth may also be set to a growth factor "N" links longer than the current longest chain to increase the number of updates that can be handled without rebuilding the table. The growth factor N may be fixed (exemplary values include 1 or 6) or it may be responsive to table size, preferably made smaller as a table gets larger, since a smaller table is more likely to insert on the longest branch and also requires more room to grow than a larger table. The worst case tree depth may also be set to a minimum value MV independent of the current longest chain value, in order to ensure room for growth.

In an alternative embodiment of the present invention rebuilding the table may be indicated once for every M insertions, where M may be a constant or may be a function of the table size. What is important is that in the present invention the number of times a table must be rebuilt is significantly reduced, over potentially several orders of magnitude, compared to prior art systems, and thus it is practical to support highly dynamic rule changes while still maintaining control over worst-case search latencies with the system and method of the present invention.

Figure 2:
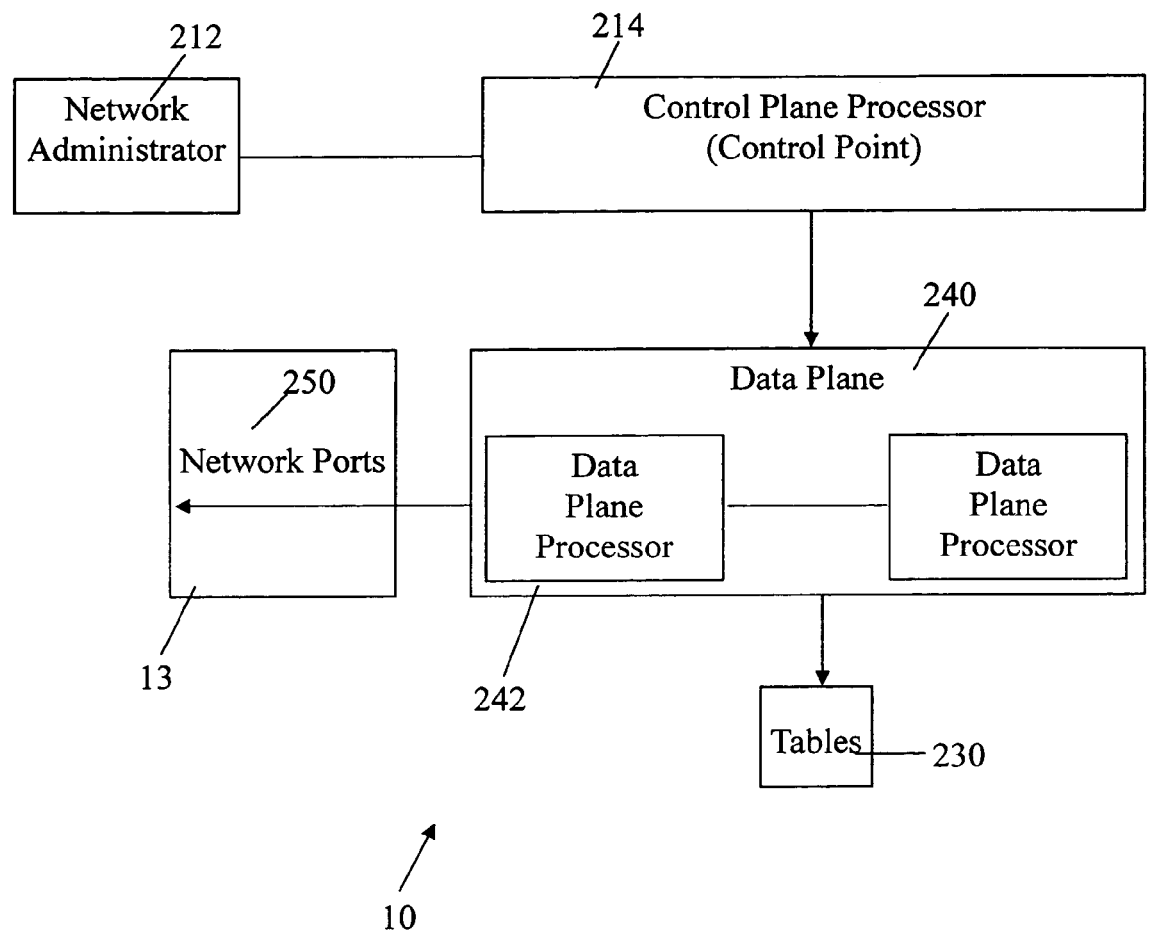
FIG. 2 is a block diagram of a computer network system appropriate to the present invention.

Referring now to FIG. 2, according to the present invention a network administrator 212 inputs rule changes to the Control Plane Processor ("Control Point") 214 of the network processing system 10, and the Control Point 214 responsively coordinates any required updates to one or more tables 230, the tables 230 accessible by one or more data plane processors 242 defining a data plane 240, wherein the data plane is interfaced with one or more network ports 250 in the gateway 13. The Control Point 214 responsively sets up appropriate tables or other appropriate search structures, enabling the data plane processors 242 to independently apply the responsively updated or changed rules to each packet forwarded by the data plane 240.

Figure 3:
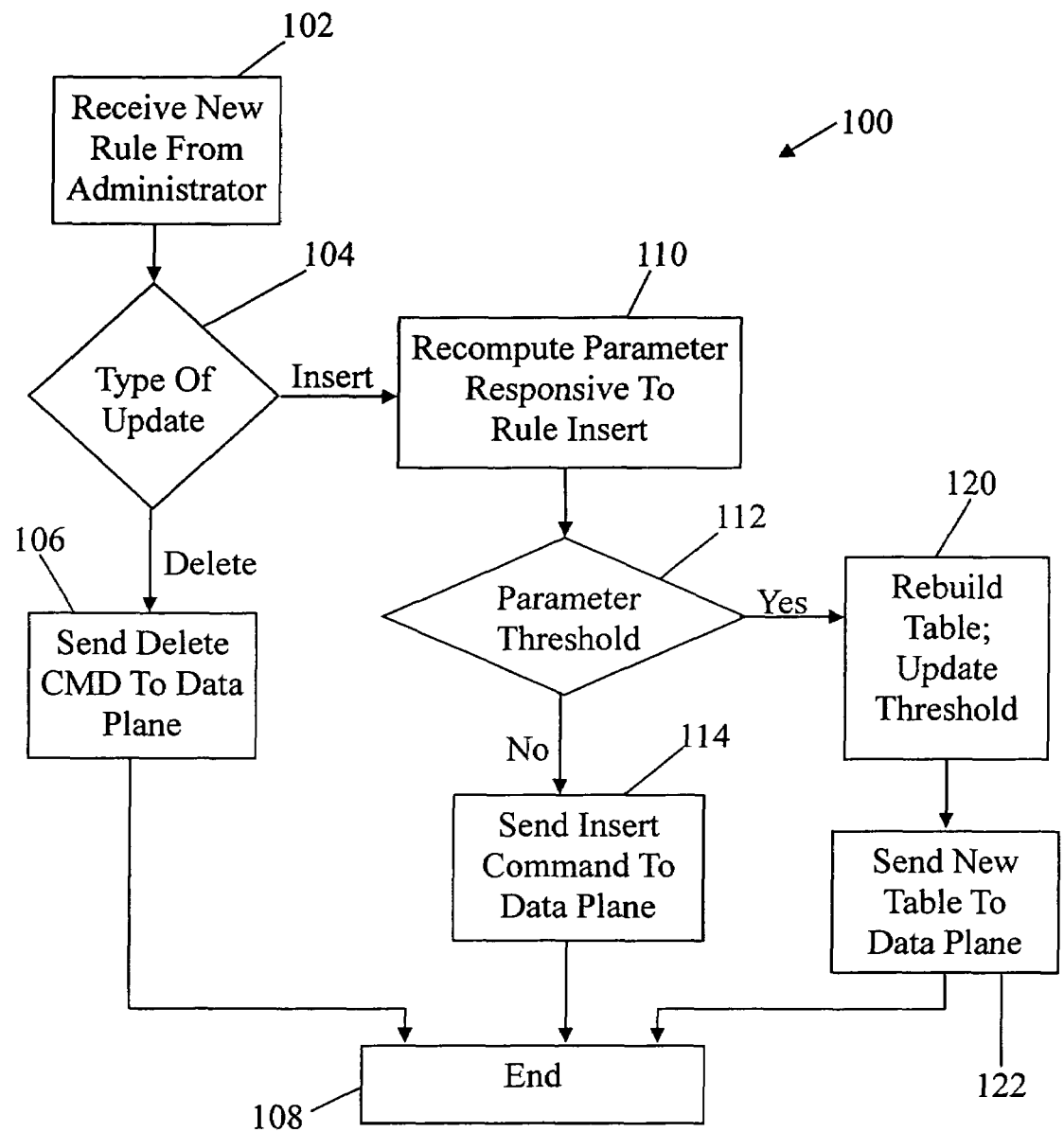
FIG. 3 is a flow chart diagram of a decision tree rebuild decision process according to the present invention.

FIG. 3 is a flow chart diagram representation of the determination of a decision tree rebuild responsive to a rule change according to the present invention. When a rule change request 102 is received by the control point, a type determination 104 is made as to whether an old rule is being removed or a new rule is being added. If an old rule is being removed, then an incremental delete command is passed directly to the data plane at step 106, and an appropriate data plane resource removes the corresponding rule from the active table; the algorithm 100 then ends at step 108.

However, if a new rule is being added into the search structure as determined at step 104, the control point responsively increments a parameter at step 110. The control point then compares the incremented parameter to a previously established threshold at step 112. If the parameter is lower than or equal to the threshold, then an incremental insert command is passed directly to the data plane at step 114, and an appropriate data plane resource inserts the corresponding rule in the active table. Alternatively, if the determination is made that the new pointer chain length is greater than the threshold, then the entire rule table is rebuilt at step 120. The new table/tree is then transferred to the data plane table memory at step 122.

It is preferred, although not required, that the threshold is set responsive to the current table. Accordingly, it is preferred that when the new tree structure is constructed in step 120 that the threshold is also recalculated responsive to at least one characteristic of the rebuilt tree, and the recalculated threshold utilized in the next iteration of step 112.

Figure 4:
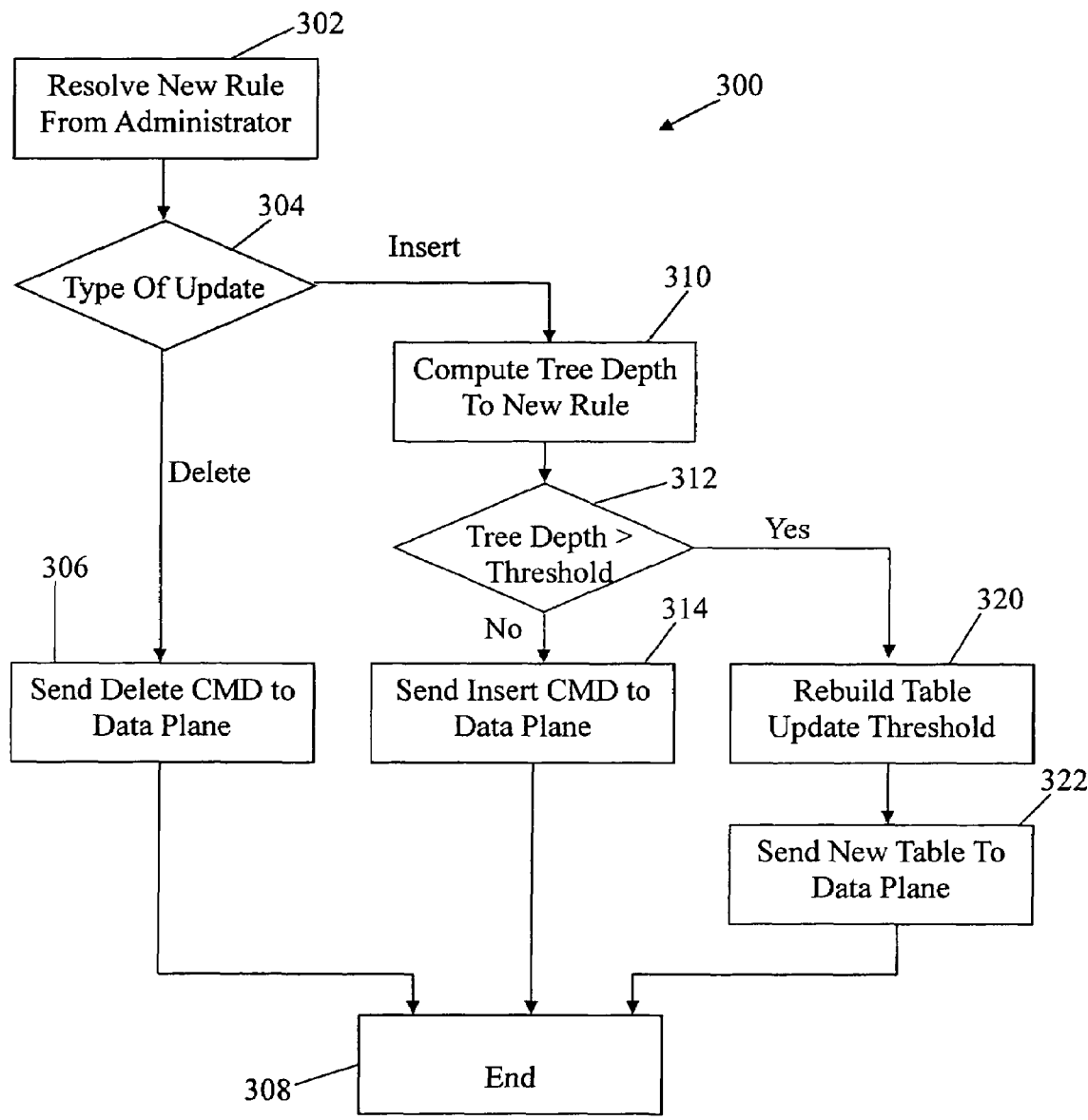
FIG. 4 is a flow chart diagram of an algorithm for rule change according to the present invention.

FIG. 4 illustrates one rule update procedure algorithm 300 according to the present invention carried out by a control point 214 in response to requests from a network administrator or other controlling entity. It is important to note that the desire to support fast incremental updates may be partially driven by applications requiring automated control of rule changes rather than being driven by human interaction. According to the present embodiment, when a rule change request 302 is received by the control point, a type determination 304 is made as to whether an old rule is being removed or a new rule is being added. If an old rule is being removed, then an incremental delete command is passed directly to the data plane at step 306, and an appropriate data plane resource removes the corresponding rule from the active table; the algorithm 300 then ends at step 308. Note that this action will always result in a shorter chain of pointers to all remaining rules downstream from the deletion point, and will not affect the length of the pointer chain (depth of tree) for all other rules. Thus, if the search latency was acceptable for achieving a specific performance level before the delete action; the search latency will also be acceptable after the delete action, since it will be less than or equal to the previous search latency.

Alternatively, if a new rule is being added into the search structure, according to the present embodiment 300 search latency to resolve the new rule may be longer than a previous worst case latency, but search latency for previously existing rules, except for the one rule at the insertion point, is not affected since the rule is always inserted at the end of a tree branch.

To prevent search latency from growing without bounds, it is preferred that a threshold is established at the time the table is built to limit the allowable tree depth. Thus if a new rule is being added into the search structure as determined at step 304, the control point computes the length of the pointer chain responsive to the new rule at step 310. The control point then compares the pointer length to the previously established threshold at step 312. If the new pointer chain length (tree depth) is lower than or equal to the threshold, then an incremental insert command is passed directly to the data plane at step 314, and an appropriate data plane resource inserts the corresponding rule in the active table. Alternatively, if the determination is made that the new pointer chain length is greater than the threshold, then the entire rule table is rebuilt at step 320 to attempt to better balance the tree depth.

Once the new tree structure has been constructed, the longest tree branch is identified. The tree depth threshold is then updated in step 322, preferably set responsive to the longest chain of pointers in the new tree. In one embodiment the tree depth threshold is set to be N links greater than the number of links in the longest branch path of the new tree. N may be set to zero, 1, or to a greater predetermined maximum value such as 6, although other desirable values may be readily apparent to one skilled in the art. Setting N to a larger value this will ensure room for growth and thus reduce the likelihood that the table will be rebuilt responsive to subsequent determination steps 312. The worst case tree depth may also be set to a minimum value MV independent of the current longest chain value: this may be desirable to give more room to grow for a small table, yet apply a tighter control to a larger table as it approaches a critical search latency. If insertions are well distributed, the larger table will be able to support more incremental insertions, even with a smaller allowable change in tree depth. Thus tighter control probably doesn't mean that the table must be rebuilt more often.

Alternatively, the growth factor N may be responsive to table size. It is preferable that N be made smaller as a table gets larger, since a smaller table is more likely to insert on the longest branch and also requires more room to grow than a larger table. For example N may be set to 6 links greater than the number of links in the longest branch path of the new tree when a small table is built (e.g. longest branch path has just 3 or 4 links). Then, each time the number of links in the longest branch increases, N is increased by a fraction of the increase in the longest branch. For example, if the longest branch increased by 2, N might be increased by 1, and further adjusted to insure N continues to be greater than the number of branches in the longest branch. Note that in any case, N should be at least equal to one greater than the number of links in the longest branch.

Once the new table has been built by the control point at step 320, the entire new table is transferred to the data plane table memory at step 322. Initially, the new table is in standby mode, and the old table continues to be used by the data plane for packet forwarding in order to avoid disruption of data plane packet forwarding. Once the new table is in place (as determined by down-load bandwidth of the system), it is placed in active state and the old table is switched to standby. Storage used by the old table can then be made available to support the next complete table swap.

Figure 5:
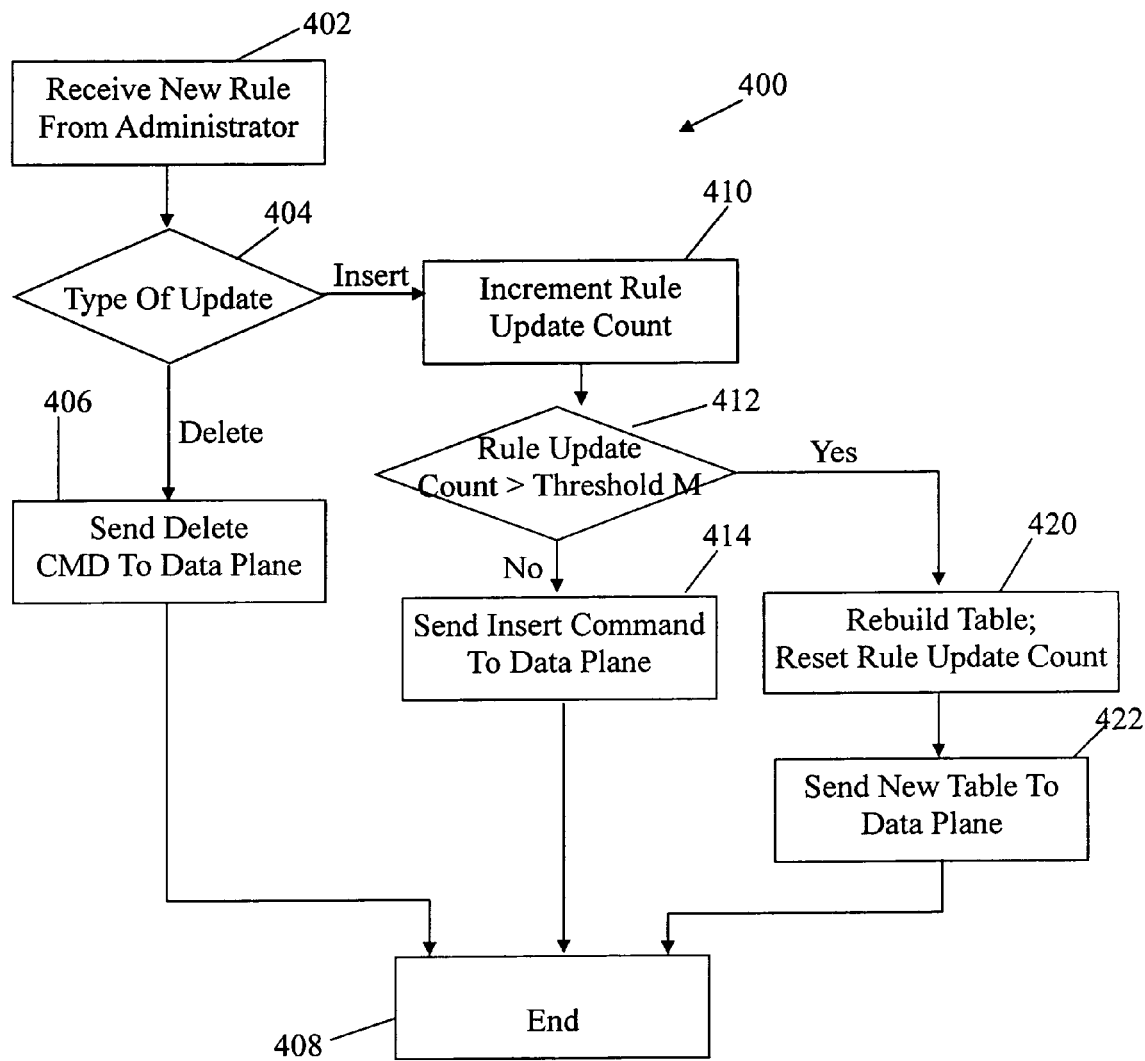
FIG. 5 is a flow chart diagram of another algorithm for rule change according to the present invention.
Figure 6:
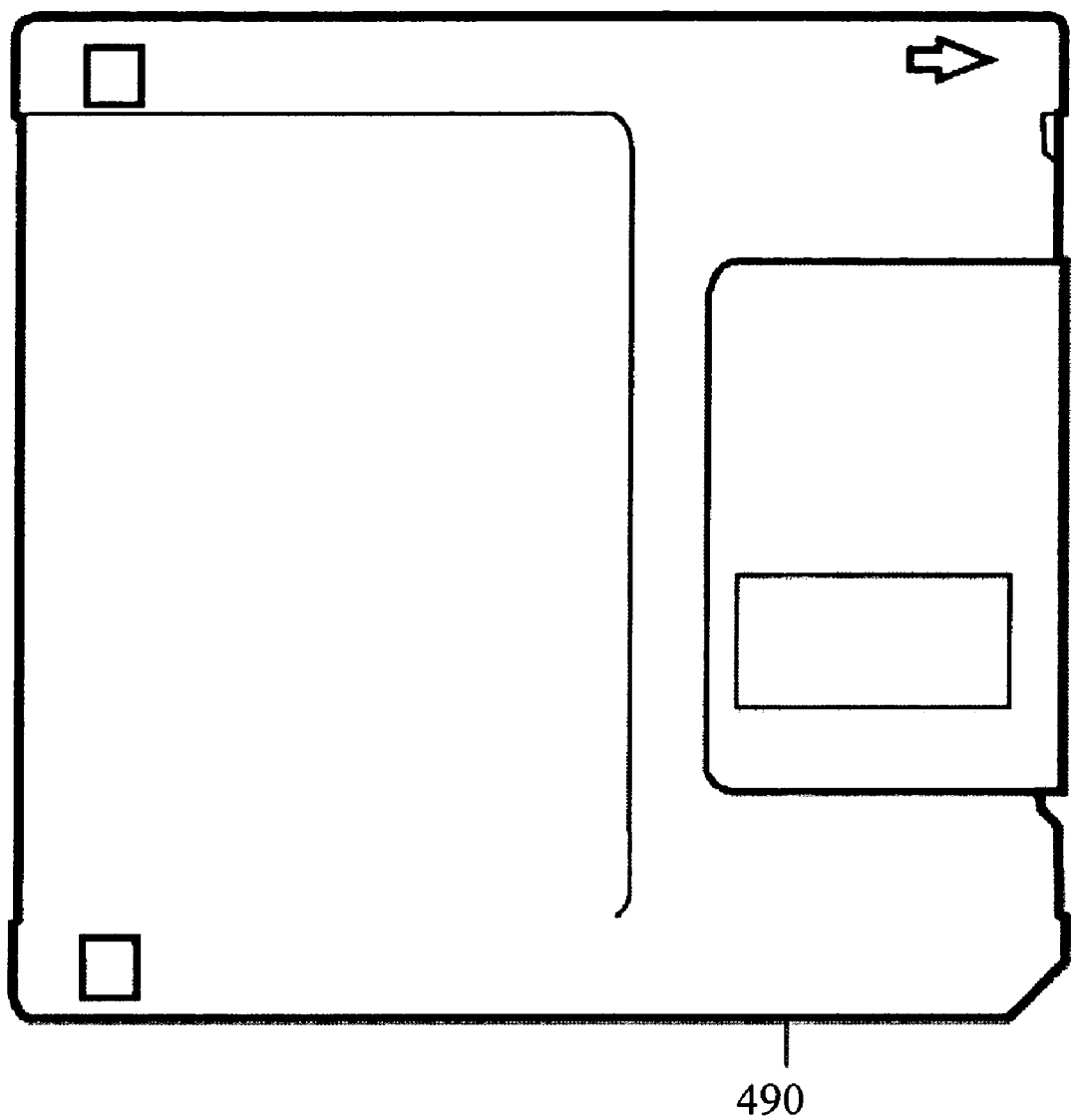
FIG. 6 is an article of manufacture comprising a computer usable medium having a computer readable program according to the present invention embodied in said medium.

FIG. 5 illustrates another algorithm embodiment 400 of the present invention. When a rule change request 402 is received by the control point, a type determination 404 is made as to whether an old rule is being removed or a new rule is being added. If an old rule is being removed, then an incremental delete command is passed directly to the data plane at step 406, and an appropriate data plane resource removes the corresponding rule from the active table; the algorithm 400 then ends at step 408.

Alternatively, if a new rule is being added into the search structure as determined at step 404, then a rule update count is incremented in step 410 to determine a total number of rule insertions since a last table rebuild in step 420. If the new rule change in step 402 results in a total rule change count that exceeds a maximum value M, then a step 420 table rebuild is indicated. The table is rebuilt and the update count is accordingly reset to zero in step 420, the new table is sent to the control plane in step 422, and the process ends for this iteration in step 408.

M may be a predetermined fixed value. In some embodiments M may be dependent upon the table size: for example M may be set to equal 25% of the number of entries in the table since the last time the table was rebuilt. Where M is dependent upon table size, then M is also updated in step 420 responsive to the size of the new table built: thus each time the table is rebuilt, M is set to a value responsive to the number of total entries in the newly built table. It will be readily apparent to one skilled in the art that other percentage values may be chosen for M, or other table attributes may be selected to drive a function selecting the value of M, and the present invention is not to be construed as restricted to the embodiments described thus far.

The embodiment of the invention described above maybe tangibly embodied in a in a computer program residing on a computer-readable medium or carrier 490 shown in FIG. 5. The medium 490 may comprise one or more of a fixed and/or removable data storage device such as a floppy disk or a CD-ROM, or it may consist of some other type of data storage or data communications device. The computer program may be loaded into memory to configure a computer processor for execution. The computer program comprises instructions which, when read and executed by a processor causes the processor to perform the steps necessary to execute the steps or elements of the present invention.

While preferred embodiments of the invention have been described herein, variations in the design may be made, and such variations may be apparent to those skilled in the art of computer network design and management, as well as to those skilled in other arts. The embodiments of the present invention identified above are by no means the only embodiments suitable for carrying out the present invention, and alternative embodiments will be readily apparent to one skilled in the art. The scope of the invention, therefore, is only to be limited by the following claims.

What is claimed is:

1. A method for applying a plurality of rules organized into a first decision tree to data packets within a network computer system, wherein the first decision tree has a plurality of chained branches of filter rules, each branch having a depth value defined by a number of linked pointers leading from a root of the tree to a tip of the branch, comprising:

setting a worst case tree depth threshold equivalent to a depth value of a longest chained branch of the first decision tree;

deleting one of the plurality of filter rules or adding a new rule;

if deleting the one of the plurality of filter rules, providing an incremental delete of the one filter rule from the first decision tree to a network data plane processor for application to network data packets; and if adding the new rule, adding the new rule to a branch of the first decision tree to form an enlarged branch; determining a total rule depth of the enlarged branch; comparing the enlarged branch total rule depth to the worst case tree depth threshold; and:

if the enlarged branch total rule depth is less than or equal to the worst case tree depth threshold providing an incremental insertion of the one filter rule to the first decision tree to a network data plane processor by providing a definition of a decision node added to the enlarged branch of the first decision tree to the network data plane processor, wherein the new decision node is inserted into a copy of the decision tree local to the network data plane processor; or if the enlarged branch total rule depth is greater than the worst case tree depth threshold, rebuilding the plurality of rules and the added new rule into a second decision tree; providing the second decision tree to the network data plane processor; and setting the worst case tree depth threshold equivalent to a depth value of a longest chained branch of the second decision tree.

2. The method of claim 1, further comprising:
setting the first tree worst case tree depth threshold responsive to the total of the plurality of rules in a longest branch in the first tree plus a value N; and
setting the second tree worst case tree depth threshold responsive to a total of the plurality of rules in the longest branch in the second tree plus a value N.

3. The method of claim 2, further comprising
determining a tree total rule size; and
setting the value N responsive to the tree total rule size.

4. The method of claim 3, wherein setting the value N comprises reducing N in inverse proportion to an increase in the tree total rule size.

5. A method for applying a plurality of rules organized into a first decision tree to data packets within a network computer system, comprising the steps of:
setting a maximum total rule change Count value M;
deleting one of the plurality of filter rules or adding a new rule;
if deleting the one of the plurality of filter rules, providing an incremental delete of the one filter rule from the first decision tree to a network data plane processor for application to network data packets;
if adding the new rule, incrementing a total count of rule additions since a building of the first tree, comparing the incremented rule addition total count to M; and
if the incremented rule addition total count is less than or equal to M, providing an incremental insertion of the one filter rule to the first decision tree to a network data plane processor; or
if the incremented rule addition total count is greater than M, rebuilding the plurality of rules and the added new rule into a second decision tree; providing the second decision tree to the network data plane processor; and resetting the incremented rule addition total count to zero.

6. The method of claim 5, further comprising
determining a first tree total rule size;
setting M responsive to the first tree total rule size;
determining a second tree total rule size; and
resetting M responsive to the second tree total rule size.

7. The method of claim 6, further comprising setting M equal to 25% of a number of entries in the table since a last time the table was rebuilt.

8. A method for applying a plurality of rules organized into a first decision tree to data packets within a network computer system, the first decision tree having a plurality of chained branches of filter rules, each branch having a depth value defined by a number of linked pointers leading from a root of the tree to a tip of the branch, comprising:
producing computer executable program code;
storing the code on a computer readable medium;
providing the program code to be deployed and executed on the computer system, the program code causing the computer system to:
set a worst case tree depth threshold equivalent to a depth value of a longest chained branch of the first decision tree;
delete one of the plurality of filter rules or add a new rule;
if deleting the one of the plurality of filter rules, provide an incremental delete of the one filter rule from the first decision tree to a network data plane processor for application to network data packets;
if adding the new rule, add the new rule to a branch of the first decision tree to form an enlarged branch; determine a total rule depth of the enlarged branch; compare the enlarged branch total rule depth to the worst case tree depth threshold; and:
if the enlarged branch total rule depth is less than or equal to the worst case tree depth threshold, provide an incremental insertion of the one filter rule to the first decision tree to a network data plane processor by providing a definition of a decision node added to the enlarged branch of the first decision tree to the network data plane processor, wherein the new decision node is inserted into a copy of the decision tree local to the network data plane processor; or
if the enlarged branch total rule depth is greater than the worst case tree depth threshold, rebuild the plurality of rules and the added new rule into a second decision tree; provide the second decision tree to the network data plane processor; and set the worst case tree depth threshold equivalent to a depth value of a longest chained branch of the second decision tree.

9. The method of claim 8, the program code comprising instructions which, when executed on the computer system, causes the computer system to:
set the first tree worst case tree depth threshold responsive to the total of the plurality of rules in a longest branch in the first tree plus a value N; and
set the second tree worst case tree depth threshold responsive to a total of the plurality of rules in the longest branch in the second tree plus a value N.

10. The method of claim 9, the program code comprising instructions which, when executed on the computer system, causes the computer system to:
determine a tree total rule size; and
set the value N responsive to the tree total rule size.

11. The method of claim 10, the program code comprising instructions which, when executed on the computer system, causes the computer system to set the value N by reducing N in inverse proportion to an increase in the tree total rule size.

12. A method for applying a plurality of rules organized into a first decision tree to data packets within a network computer system, comprising:
   producing computer executable program code;
   storing the code on a computer readable medium;
   providing the program code to be deployed and executed on the computer system, the program code causing the computer system to:
   set a maximum total rule change count value M;
   delete one of the plurality of filter rules or add a new rule;
   if deleting the one of the plurality of filter rules, provide an incremental delete of the one filter rule from the first decision tree to a network data plane processor for application to network data packets;
   if adding the new rule, increment a total count of rule additions since a building of the first tree, compare the incremented rule addition total count to M, and:
      if the incremented rule addition total count is less than or equal to M, provide an incremental insertion of the one filter rule to the first decision tree to a network data plane processor; or
      if the incremented rule addition total count is greater than M, rebuild the plurality of rules and the added new rule into a second decision tree; provide the second decision tree to the network data plane processor; and reset the incremented rule addition total count to zero.

13. The method of claim 12, the program code comprising instructions which, when executed on the computer system, causes the computer system to further:
   determine a first tree total rule size;
   set M responsive to the first tree total rule size;
   determine a second tree total rule size; and
   reset M responsive to the second tree total rule size.

14. The method of claim 13, the program code comprising instructions which, when executed on the computer system, causes the computer system to set M equal to 25% of a number of entries in the table since a last time the table was rebuilt.

* * * * *